US012700624B2

(12) United States Patent
Yu et al.

(10) Patent No.: US 12,700,624 B2
(45) Date of Patent: Aug. 4, 2026

(54) DISASSEMBLY MECHANISM, DISASSEMBLY SYSTEM FOR POWER BATTERY PACK WITH DISASSEMBLY MECHANISM AND DISASSEMBLY METHOD OF POWER BATTERY PACK

(71) Applicants:GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Changdong Li, Foshan (CN); Yinghao Xie, Foshan (CN); Xuemei Zhang, Foshan (CN); Kang Chen, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 658 days.

(21) Appl. No.: 18/216,612

(22) Filed: Jun. 30, 2023

(65) Prior Publication Data

US 2023/0344031 A1    Oct. 26, 2023

Related U.S. Application Data

(63) Continuation of application No. PCT/CN2022/095692, filed on May 27, 2022.

(30) Foreign Application Priority Data

Sep. 23, 2021    (CN) .......................... 202111117526.4

(51) Int. Cl.
*B23P 21/00*        (2006.01)
*B09B 3/32*        (2022.01)
        (Continued)

(52) U.S. Cl.
CPC .............. *H01M 10/54* (2013.01); *B09B 3/32* (2022.01); *B09B 3/80* (2022.01); *B09B 2101/16* (2022.01)

(58) Field of Classification Search
CPC ......... B09B 3/32; B09B 3/80; B09B 2101/16; H01M 10/54; Y02W 30/84
See application file for complete search history.

(56) References Cited

U.S. PATENT DOCUMENTS

2012/0308873 A1*  12/2012  Sekino ................ H01M 50/227
                                                    429/156
2019/0198952 A1*   6/2019  Choi .................... H01M 50/271
2023/0060659 A1*   3/2023  Cournoyer ........... H01M 10/02

FOREIGN PATENT DOCUMENTS

CN        104157927 A    11/2014
CN        108539314 A     9/2018
        (Continued)

OTHER PUBLICATIONS

International Search Report of PCT Patent Application No. PCT/CN2022/095692 issued on Aug. 8, 2022.

*Primary Examiner* — Paul D Kim
(74) *Attorney, Agent, or Firm* — Westbridge IP LLC

(57)        ABSTRACT

The present disclosure provides a disassembly mechanism, a disassembly system of a power battery pack with the disassembly mechanism and a disassembly method of the power battery pack. The above disassembly mechanism includes a die base assembly, a pressing assembly and a removal tool assembly. The pressing assembly is movably connected to the die base assembly, and is used to abut against and press a single battery of a power battery pack.

(Continued)

The removal tool assembly is slidably connected to the die base assembly and elastically connected to the die base assembly. The removal tool assembly is used to squeeze and separate a casing and the single battery of the power battery pack. The above disassembly mechanism can realize automatic disassembly of the power battery pack with few manual intervention, and solves the problem of low efficiency in the recycling and disassembly process of the power battery pack.

10 Claims, 11 Drawing Sheets

(51) Int. Cl.
| | | |
|---|---|---|
| B09B 3/80 | (2022.01) | |
| B23Q 15/00 | (2006.01) | |
| H01M 10/54 | (2006.01) | |
| B09B 101/16 | (2022.01) | |

(56) References Cited

FOREIGN PATENT DOCUMENTS

| | | | |
|---|---|---|---|
| CN | 209936991 U | 1/2020 | |
| CN | 210099121 U | 2/2020 | |
| CN | 210778886 U | 6/2020 | |
| CN | 111969271 A | 11/2020 | |
| CN | 212471625 U | 2/2021 | |

* cited by examiner

30

32b

32

32a

34

10

110

120

134 } 130

132

30

132

132a 1324          1322

DISASSEMBLY MECHANISM, DISASSEMBLY SYSTEM FOR POWER BATTERY PACK WITH DISASSEMBLY MECHANISM AND DISASSEMBLY METHOD OF POWER BATTERY PACK

CROSS REFERENCE TO RELATED APPLICATIONS

The present application is a Continuation Application of PCT Application No. PCT/CN2022/095692 filed on May 27, 2022, which claims the benefit of Chinese Patent Application No. 202111117526.4 filed on Sep. 23, 2021, the contents of which are incorporated herein by reference in their entirety.

TECHNICAL FIELD

The present disclosure relates to the technical field of recycling of new energy materials, and in particular to a disassembly mechanism, a disassembly system of a power battery pack with the disassembly mechanism and a disassembly method of the power battery pack.

BACKGROUND

With the increasing demand of environmental protection, a large number of decommissioned waste batteries need to be recycled. When recycling waste batteries such as power battery packs, it is necessary to remove an outer packaging of the power battery pack and auxiliary materials such as battery panels before taking out the single power battery.

However, the outer packaging of the power battery pack is an aluminum covering case, that is, an aluminum case, and an adhesive is used between the aluminum case and a surface of the single battery, which makes the disassembly of the power battery pack more difficult. It is necessary to use tools to mill the aluminum case on the surface, and then use other tools to remove the rest of the aluminum case on the surface. The entire disassembly process is cumbersome and requires many manual interventions, which has low efficiency and safety.

SUMMARY OF THE INVENTION

An objective of the present disclosure is to overcome deficiencies in the prior art and provide a disassembly mechanism, a disassembly system for a power battery pack with the disassembly mechanism and a disassembly method of the power battery pack.

The objective of the present disclosure is achieved by the following technical solutions.

A disassembly mechanism is provided, including:
a die base assembly;
a pressing assembly, movably connected to the die base assembly, and used to abut against and press a single battery of a power battery pack; and
a removal tool assembly, slidably connected to the die base assembly, and elastically connected to the die base assembly, and used to squeeze and separate a casing of the power battery pack from the single battery.

A disassembly system for a power battery pack is provided, including the disassembly mechanism according to any one of the above embodiments.

A disassembly method of a power battery pack is provided, comprising disassembling a powder battery using the above disassembly system for the power battery pack.

Compared with the prior art, the present disclosure at least has the following advantages:

According to the disassembly mechanism of the present disclosure, during disassembly of a waste power battery pack, the power battery pack is placed on a disassembly table with an opening of the casing upward. Since the pressing assembly is movably connected to the die base assembly and the removal tool assembly is slidably connected to the die base assembly, when the die base assembly moves toward the disassembly table, the pressing assembly and the removal tool assembly moves with the die base assembly. Therefore, the pressing assembly abuts against and presses the single battery of the power battery pack to locate the single battery, and at the same time, the removal tool assembly squeezes and separates the casing from the single battery of the power battery pack. The above disassembly mechanism can realize automatic disassembly of the power battery pack with few manual intervention, and solves the problem of low efficiency in the recycling and disassembly process of the power battery pack. The above disassembly mechanism realizes the automatic disassembly of the power battery pack, and improves the safety of the disassembly of a power battery pack.

BRIEF DESCRIPTION OF THE DRAWINGS

To describe the technical solutions in the embodiments of the present disclosure more clearly, the following briefly describes the accompanying drawings needed for describing the embodiments. It should be understood that the following accompanying drawings show merely some embodiments of the present disclosure, and therefore should not be regarded as a limitation on the scope. Those of ordinary skill in the art may still derive other related drawings from these accompanying drawings without creative efforts.

3

Figure 8:
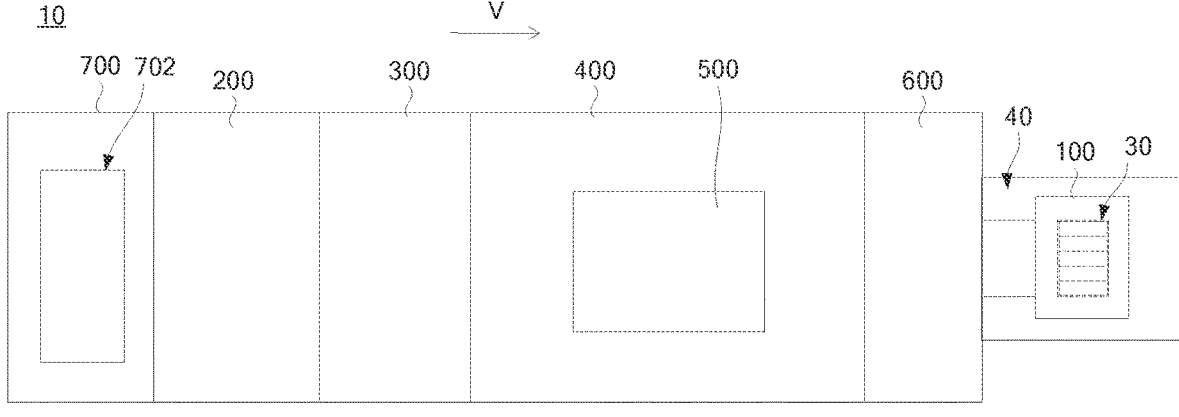
FIG. 8 is a schematic structural diagram of a disassembly system of a power battery pack according to an embodiment.
Figure 12:
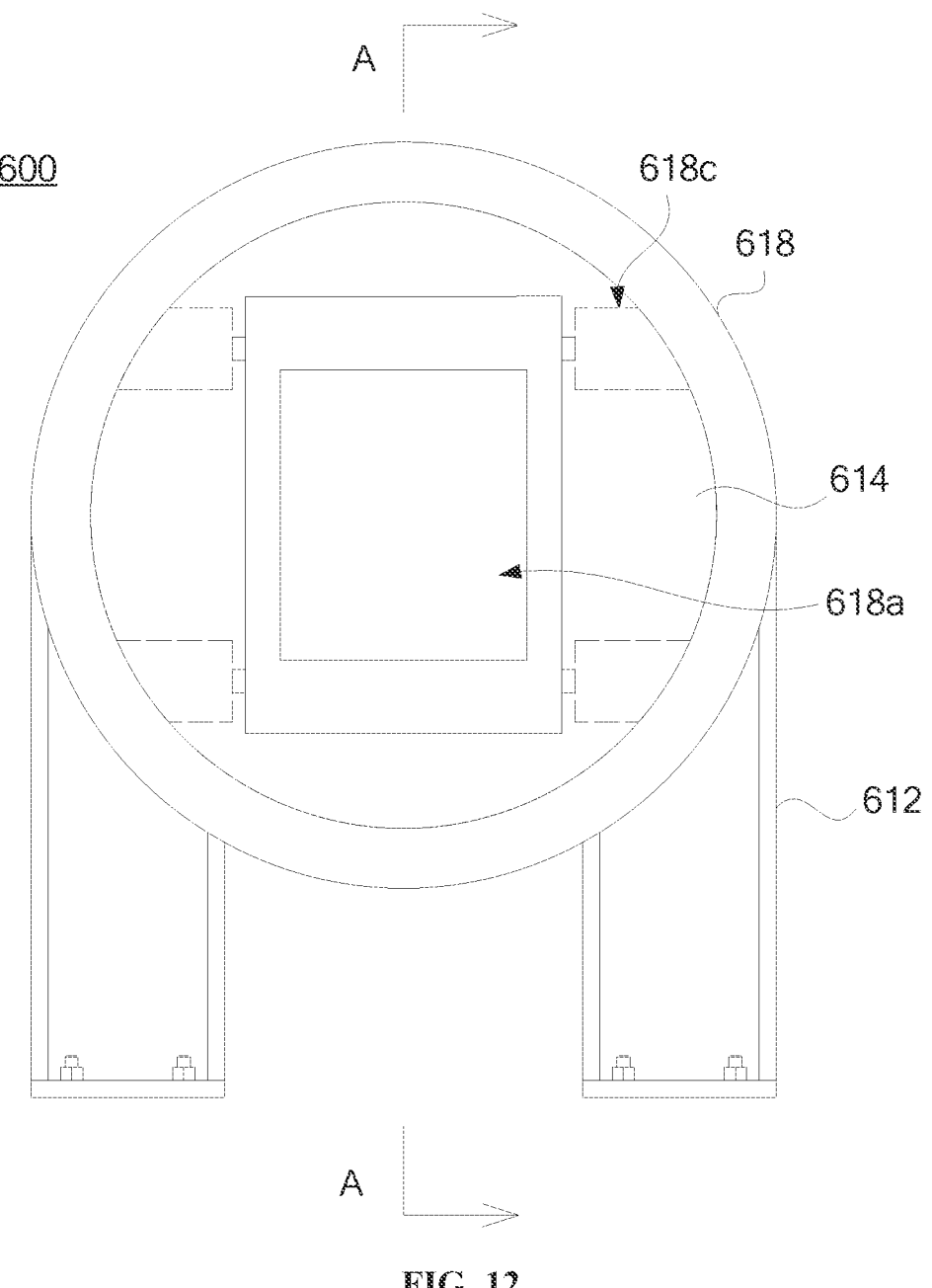
Figure 13:
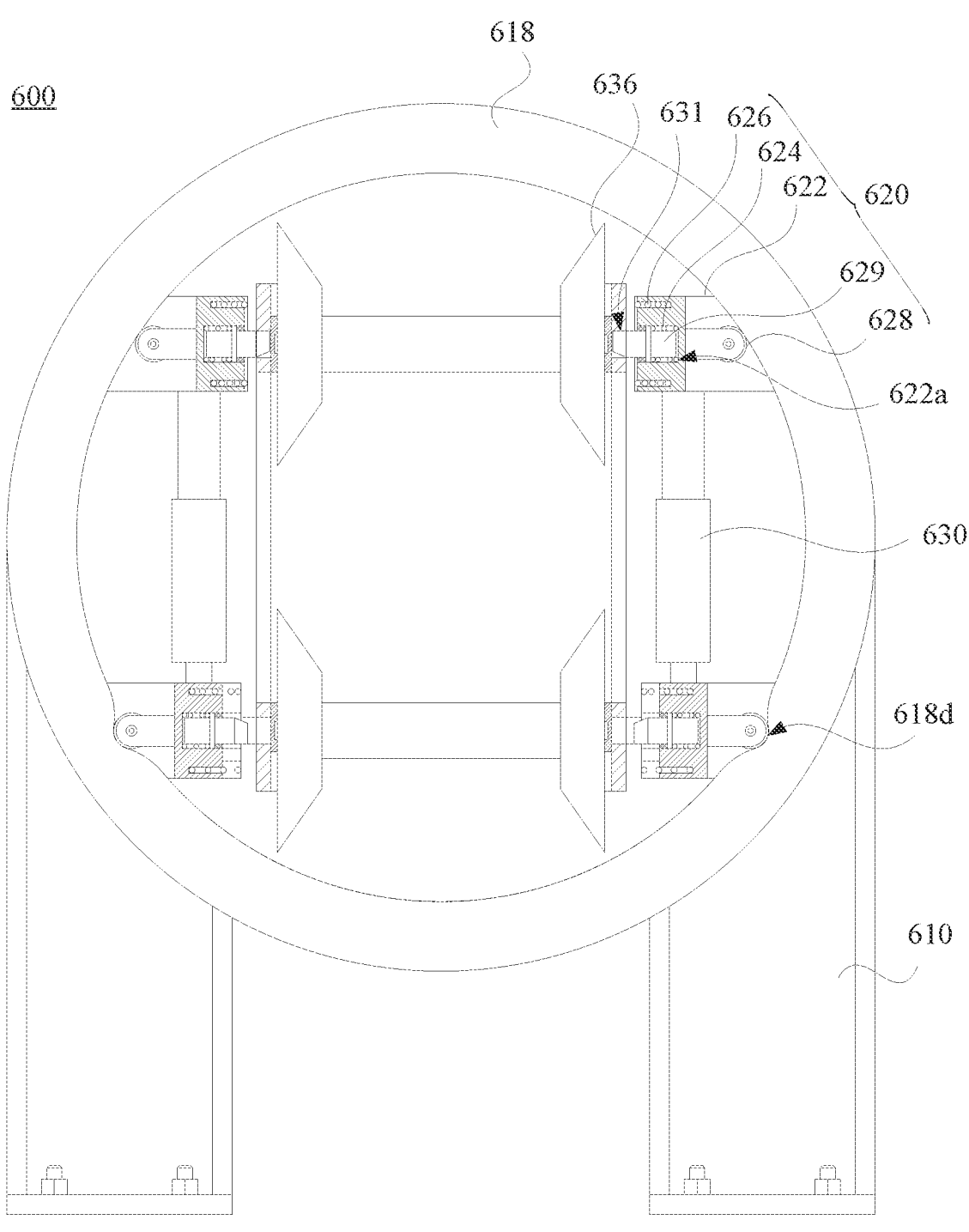
Figure 14:
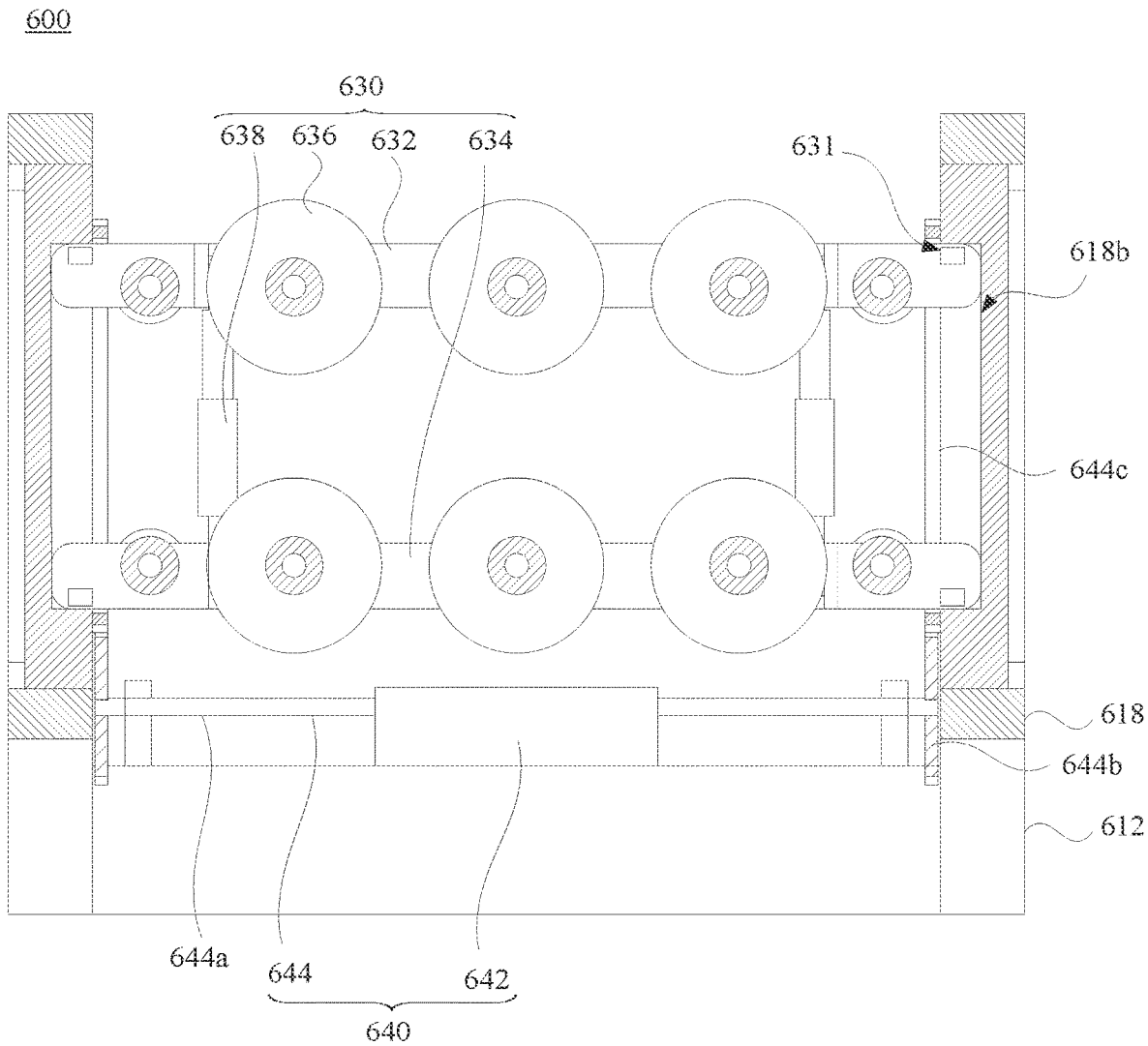
Figure 15:
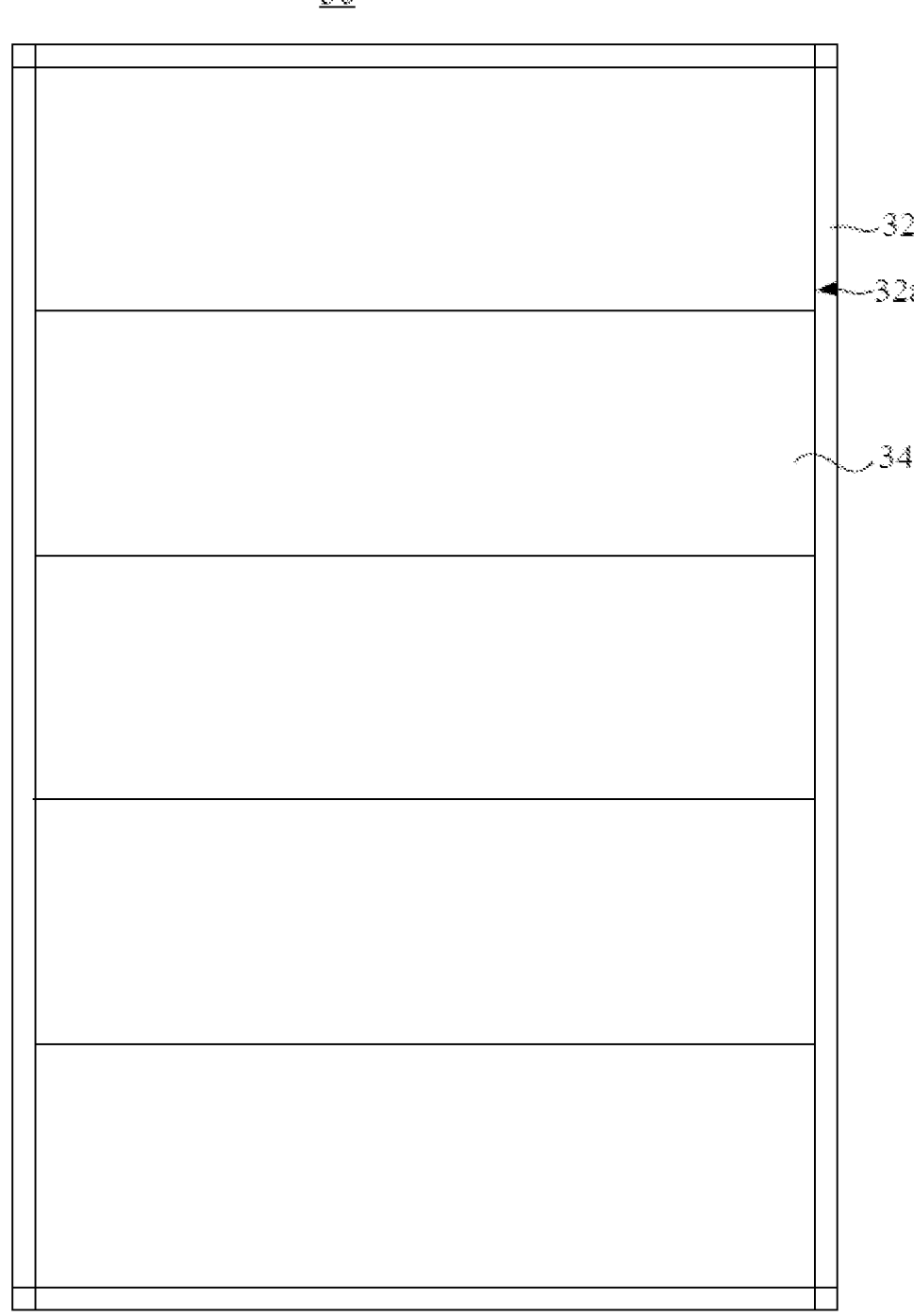

FIG. 12 is a schematic local structural diagram of a turning device of the disassembly system of the power battery pack as shown in FIG. 8;

FIG. 13 is a partial sectional view of the turning device as shown in FIG. 12;

FIG. 14 is a sectional view of the turning device as shown in FIG. 12 along a line A-A; and FIG. 15 is a schematic structural diagram of a power battery pack in a case that a side piece structure of a casing of the power battery pack at the periphery of an exposed opening is cut off.

DETAILED DESCRIPTION OF THE EMBODIMENTS

In order to facilitate the understanding of the present disclosure, the present disclosure is described more completely below with reference to the accompanying drawings. The drawings show preferred implementations of the present disclosure. However, the present closure may be embodied in various forms without being limited to the implementations set forth herein. Rather, these implementations are provided such that the disclosure content of the present disclosure will be understood more thoroughly and comprehensively.

It should be noted that when a component is "fixed to" another component, the component may be fixed to another component directly or via an intermediate component. When a component is "connected to" another component, the component may be connected to another component directly or via an intermediate component. The terms "vertical", "horizontal", "left", and "right" and similar expressions used herein are just for illustrative purposes, and do not mean sole implementations.

Unless otherwise defined, all technical and scientific terms used herein have the same meaning as commonly understood by those skilled in the technical field of the present disclosure. The terms used in the specification of the present disclosure herein are only for the purpose of describing specific implementations, and are not intended to limit the present disclosure. The term "and/or" used herein includes any and all combinations of one or more of the associated listed items.

The present disclosure provides a disassembly mechanism, including a die base assembly, a pressing assembly and a removal tool assembly. The pressing assembly is movably connected to the die base assembly, and is used to abut against and press a single battery of a power battery pack. The removal tool assembly is slidably connected to the die base assembly and elastically connected to the die base assembly. The removal tool assembly is used to squeeze and separate a casing of the power battery pack from the single battery.

According to the above disassembly mechanism, during disassembly of the waste power battery pack, the power battery pack is placed on a disassembly table with an opening of the casing upward. Since the pressing assembly is movably connected to the die base assembly and the removal tool assembly is slidably connected to the die base assembly, when the die base assembly moves toward the disassembly table, the pressing assembly and the removal tool assembly moves with the die base assembly. Therefore, the pressing assembly abuts against and presses the single battery of the power battery pack to locate the single battery, and at the same time, the removal tool assembly squeezes and separates the casing from the single battery of the power battery pack. The above disassembly mechanism can realize automatic disassembly of the power battery pack with few manual intervention, and solves the problem of low efficiency in the recycling and disassembly process of the power battery pack. The above disassembly mechanism realizes the automatic disassembly of the power battery pack, and improves the safety of the disassembly of the power battery pack.

To better understand the technical solutions and beneficial effects of the present disclosure, the present disclosure will be further described in detail with reference to specific embodiments.

Figure 1:
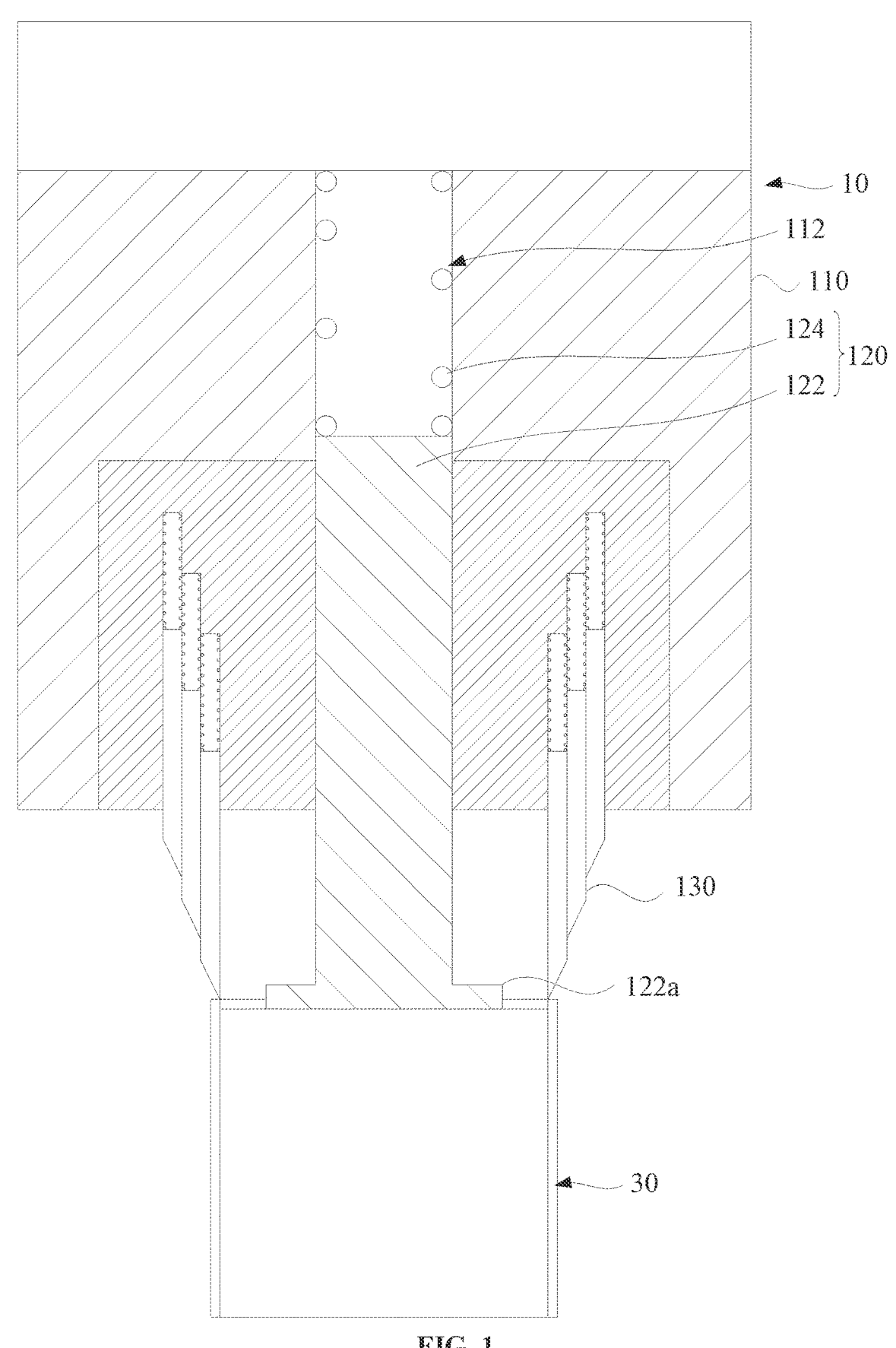
FIG. 1 is a schematic diagram of a state in which a disassembly mechanism disassembles a power battery pack according to an embodiment.
Figures 2, 3:
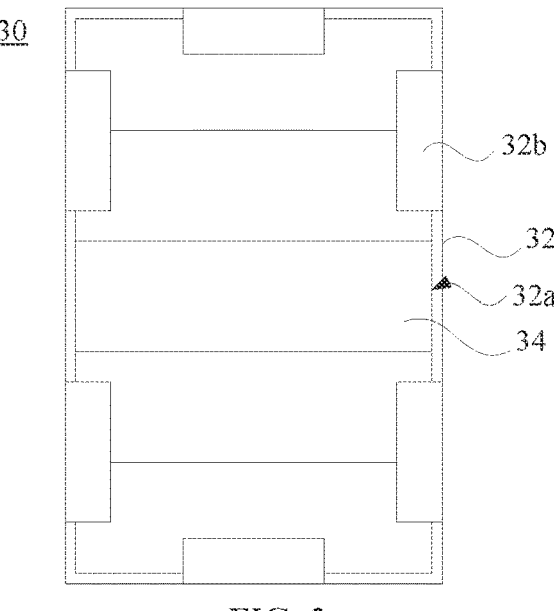
FIG. 2 is a schematic structural diagram of the power battery pack disassembled by the disassembly mechanism as shown in FIG. 1.
FIG. 3 is a schematic diagram of another state in which the disassembly mechanism disassembles the power battery pack as shown in FIG. 1.

As shown in FIG. 1 to FIG. 2, a disassembly mechanism 10 of an embodiment is used to disassemble a power battery pack 30 on a disassembly table. In one of the embodiments, the disassembly mechanism 10 includes a die base assembly 110, a pressing assembly 120 and a removal tool assembly 130. The die base assembly 110 is installed at a power output end of a driving mechanism of the disassembly mechanism 10, such that the driving mechanism drives the die base assembly 110 to move relative to the disassembly table. The pressing assembly 120 is movably connected to the die base assembly 110, and the pressing assembly 120 is used to abut against and press a single battery of the power battery pack 30 to locate the power battery pack 30 during disassembly of the power battery pack 30. The removal tool assembly 130 is slidably connected to the die base assembly 110, and the removal tool assembly 130 is elastically connected to the die base assembly 110. The removal tool assembly 130 is used to squeeze and separate the casing from the single battery of the power battery pack 30, such that the casing and the single battery are separated.

Figure 4:
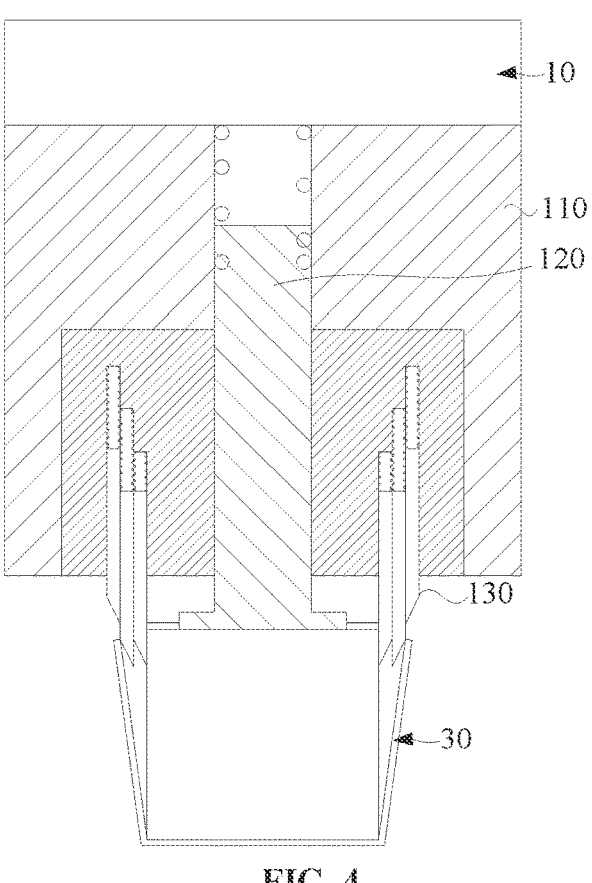
FIG. 4 is a schematic diagram of a still another state in which the disassembly mechanism disassembles the power battery pack as shown in FIG. 1.
Figure 5:
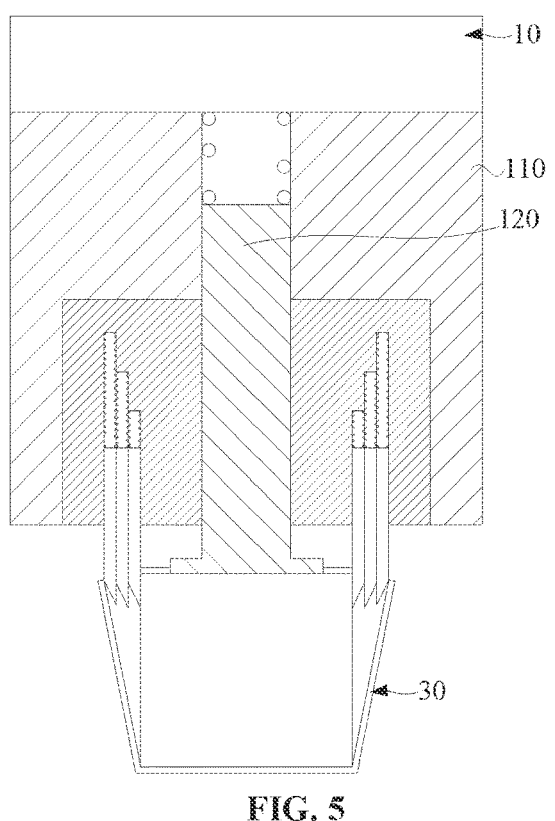
FIG. 5 is a schematic diagram of a yet another state in which the disassembly mechanism disassembles the power battery pack as shown in FIG. 1.

According to the above disassembly mechanism 10, during disassembly of the waste power battery pack 30, the power battery pack 30 is placed on the disassembly table with an opening of the casing upward. Since the pressing assembly 120 is movably connected to the die base assembly 110 and the removal tool assembly 130 is slidably connected to the die base assembly 110, as shown in FIG. 1, when the die base assembly 110 moves toward the disassembly table, the pressing assembly 120 and the removal tool assembly 130 move with the die base assembly 110. Therefore, the pressing assembly 120 abuts against and presses the single battery of the power battery pack 30 to locate the single battery, and at the same time, as shown in FIG. 3 to FIG. 5, the removal tool assembly 130 squeezes and separates the casing from the single battery of the power battery pack 30, such that the casing and the single battery of the power battery pack 30 are separated. The above disassembly mechanism 10 can realize automatic disassembly of the power battery pack 30 with few manual intervention, and solves the problem of low efficiency in the recycling and disassembly process of the power battery pack 30. The above disassembly mechanism 10 realizes the automatic disassembly of the power battery pack 30, and improves the safety of the disassembly of the power battery pack 30.

As shown in FIG. 2, in one of the embodiments, the power battery pack 30 includes the casing 32 and the single battery 34. The casing is an aluminum casing, and covers surrounding side walls and a bottom surface of the single battery, such that the power battery has five metal surfaces. An exposed opening 32*a* is formed in the casing, and the casing forms a bent side piece structure 32*b* at the periphery of the exposed opening, such that the single battery is limited in the casing, and a top surface of the single battery is exposed at the exposed opening, such that the powder battery has a plastic surface. Specifically, a plurality of side piece structures are arranged, and the plurality of side piece structures are distributed at intervals, and the plurality of side piece structures jointly limit the top surface of the single battery, and at the same time, the plastic surface of the single battery of the power battery pack 30 is exposed at the exposed opening. However, before disassembly of the power battery pack 30, the power battery pack 30 is often irregularly placed, that is, the power battery pack 30 is not necessarily placed with the exposed opening upward. In other words, before disassembly of the power battery pack 30, the power battery pack 30 may be placed with the exposed opening downward, left, right, forward, backward, or upward. It needs to be manually confirmed one by one and transported to the disassembly table, and the power battery pack 30 needs to be placed on the disassembly table with the exposed opening upward for subsequent cutting of the plurality of side piece structures to form a cutting opening. Therefore, an edge of a connection of the metal casing of the power battery pack 30 and the single battery is completely exposed through the cutting opening to facilitate subsequent disassembly and separation of the edge of the connection of the single battery and the metal casing by the disassembly mechanism 10. Due to the large number of power battery packs 30 that need to be disassembled, the labor intensity of the operator is relatively high, and the weight of the power battery pack 30 is relatively heavy, it is dangerous for the operator to carry the power battery pack 30 to the disassembly table, and it is easy to cause accidental injury to the operator, and at the same time, the operation safety and efficiency of the disassembly of the power battery pack 30 are low.

As shown in FIG. 3, in one of the embodiments, two removal tool assemblies 130 are arranged, and the two removal tool assemblies 130 are arranged on both sides of the pressing assembly 120 respectively, such that two opposite edges of the casing of the power battery pack 30 can be separated from the single battery by the disassembly mechanism 10 at the same time. In the present embodiment, the two removal tool assemblies 130 are symmetrically arranged on the both sides of the pressing assembly 120. A shadow projected by the casing of the power battery pack 30 on the disassembly table is rectangular, such that four sides of the casing forms two pairs of opposite edges, namely, a first pair of edges and a second pair of edges respectively. After the first pair of edges of the casing is separated from the single battery by the disassembly mechanism 10, the power battery pack 30 is rotated by 90°, and the second pair of edges of the casing is separated from the single battery by the disassembly mechanism 10, so as to complete disassembly of the power battery pack 30.

As shown in FIG. 1, in one of the embodiments, the pressing assembly 120 is further elastically connected to the die base assembly 110, such that the pressing assembly 120 is elastically and slidably connected to the die base assembly 110, and then, the pressing assembly 120 elastically abuts against and presses the single battery, thereby avoiding excessive pressure when the pressing assembly 120 presses the single battery. Further, the pressing assembly 120 includes a pressing piece 122 and a first elastic member 124. A first sliding groove 112 is formed in the die base assembly 110. The first elastic member 124 is arranged in the first sliding groove 112. A part of the pressing piece 122 is located in the first sliding groove 112 and slidably connected with the die base assembly 110, and the pressing piece 122 abuts against the first elastic member 124, such that the pressing piece 122 is elastically and slidably connected to the die base assembly 110, and at the same time, the pressing piece 122 reliably abuts against and presses the single battery. In the present embodiment, the first elastic member 124 is a coil spring or an elastic rubber sleeve, such that the first elastic member 124 has relatively good elastic strength.

Figure 6:
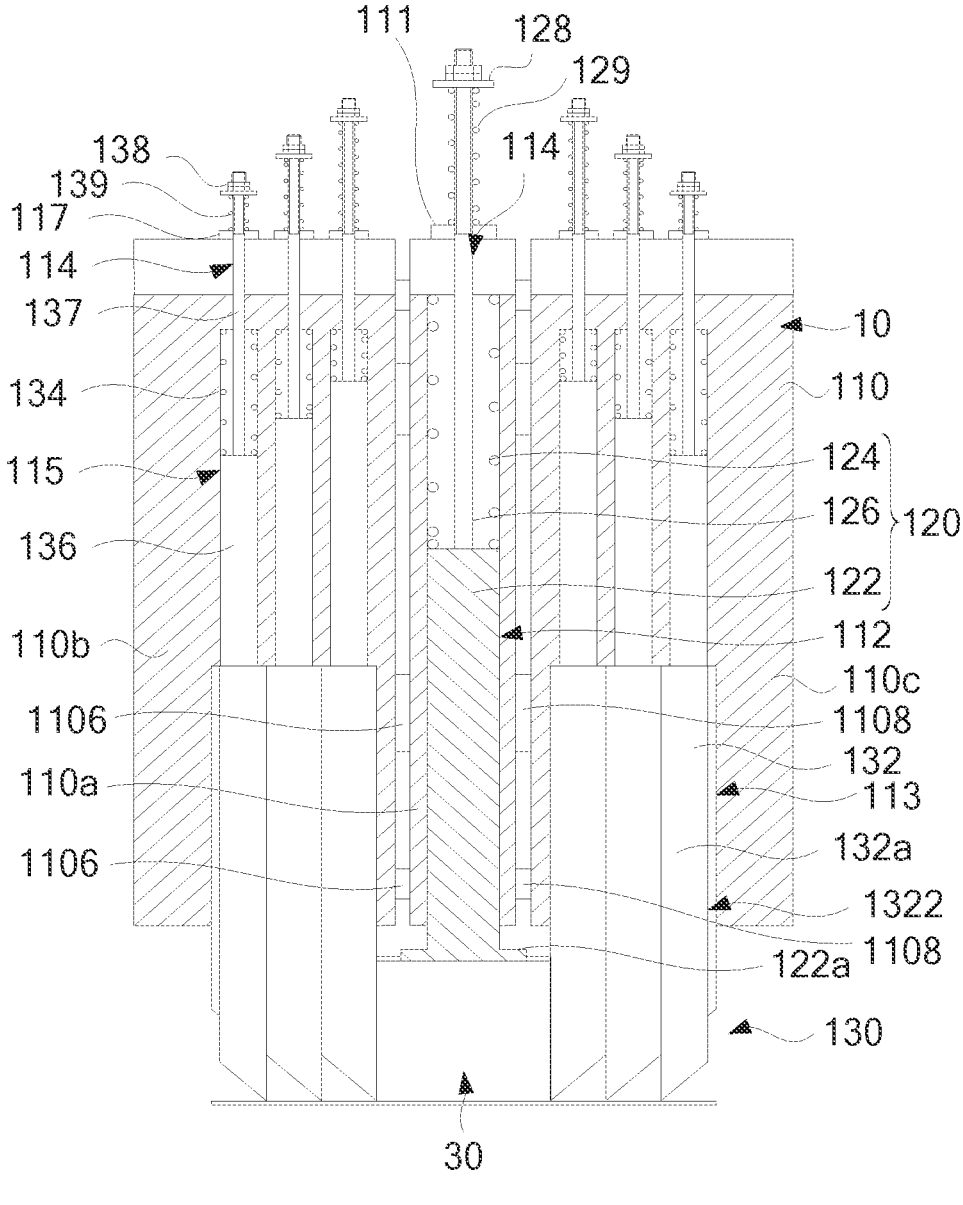
FIG. 6 is a schematic structural diagram of a power battery pack disassembled by a disassembly mechanism according to another embodiment.

As shown in FIG. 6, in one of the embodiments, the pressing assembly 120 further includes a first guide rod 126. A first sliding guide hole 114 communicated with the first sliding groove 112 is formed in the die base assembly 110. The first guide rod 126 penetrates the first sliding guide hole 114 and is slidably connected with the die base assembly 110. One end of the first guide rod 126 is connected with the pressing piece 122, such that the pressing piece 122 slides in a direction guided by the first guide rod 126 when sliding relative to the die base assembly 110, which improves the accuracy of sliding of the pressing piece 122 relative to the die base assembly 110. The first elastic member 124 is arranged around the first guide rod 126, such that the first elastic member 124 is not prone to deviation when the pressing piece 122 presses the first elastic member 124, and then, the pressing piece 122 presses the first elastic member 124 along the guide of the first guide rod 126, thereby improving the accuracy of elastically pressing the single battery by the pressing piece 122.

In order to prevent the first guide rod 126 from being separated from the die base assembly 110 during sliding relative to the die base assembly 110, as shown in FIG. 6, further, the pressing assembly 120 also includes a first limiting member 128 and a first limiting spring 129. The first limiting spring 129 is sleeved on the first guide rod 126, and the first limiting spring 129 abuts against a side of the die base assembly 110 away from the pressing piece 122. The first limiting member 128 is sleeved on the first guide rod 126 and is in threaded connection with the first guide rod 126, and the first limiting member 128 abuts against the first limiting spring 129, such that an end of the first guide rod 126 away from the pressing piece 122 is limited to the side of the die base assembly 110 away from the pressing piece 122 through the first limiting member 128, preventing the first guide rod 126 from being separated from the die base assembly 110 during sliding relative to the die base assembly 110. In the present embodiment, a diameter of the first sliding groove 112 is greater than a diameter of the first sliding guide hole 114, and a diameter of the pressing piece 122 is greater than the diameter of the first sliding guide hole 114, such that the pressing piece 122 is limited to a side of the die base assembly 110 away from the first limiting member 128. The first limiting member 128 is a lock nut, and the first limiting member 128 is detachably connected with the first guide rod 126 to facilitate the disassembly, assembly and maintenance of the pressing assembly 120, which improves a easy operation of the disassembly mechanism 10. In order to make the first limiting spring 129 abut against the die base assembly 110 better, further, a first abutment table 111 protrudes from the die base assembly 110, and both ends of the first limiting spring 129 abut against the first abutting table 111 and the first limiting member respectively. The limiting effect of the first limiting member 128 and the first limiting spring 129 is to limit sliding displacement of the first guide rod 126, avoiding the problem of excessive retraction of the pressing piece 122 due to changes in elastic force of the first elastic member 124 corresponding to the pressing piece 122, and improving the reliability of the sliding of the pressing piece 122 relative to the die base assembly 110. Further, a limiting block 122a is arranged on an end of the pressing piece 122 away from the first limiting spring 129, and a width of the limiting block is greater than an inner diameter of the first sliding guide hole 114, such that the end of the pressing piece 122 away from the first limiting spring 129 is limited to one side of the die base assembly 110.

As shown in FIG. 3, in one of the embodiments, the removal tool assembly 130 includes a removal tool member 132 and a second elastic member 134. The removal tool member 132 is slidably connected to the die base assembly 110, and the second elastic member 134 is connected with the removal tool member 132 and the die base assembly 110 respectively, such that the removal tool member 132 is elastically and slidably connected to the die base assembly 110. In the present embodiment, the second elastic member 134 is a coil spring. In one of the embodiments, a second sliding groove 113 is formed in the die base assembly 110, the removal tool member 132 is located in the second sliding groove 113 and slidably connected with the die base assembly 110, the second elastic member 134 is arranged in the second sliding groove 113, and the second elastic member 134 is connected with the removal tool member 132, and the removal tool member 132 slides relative to the die base assembly 110, such that the removal tool member 132 and the die base assembly 110 slide more smoothly, and then, the removal tool member 132 can more accurately squeeze and separate the casing from the single battery.

As shown in FIG. 6, in one of the embodiments, the removal tool member 132 includes a plurality of removal tools 132a, any two adjacent removal tools 132a are slidably connected with each other, a plurality of second elastic members 134 are arranged, and the plurality of second elastic members 134 are connected with one corresponding removal tool 132a respectively, such that each removal tool 132a is connected with the die base assembly 110 through corresponding second elastic member 134, and then, each removal tool 132a is elastically connected to the die base assembly 110. In addition, any two adjacent removal tools 132a are slidably connected with each other, such that the two adjacent removal tools 132a can slide relative to each other. In any embodiment of the present disclosure, a plurality of means two or more.

As shown in FIG. 6, in one of the embodiments, a sliding connection groove 1322 is formed in one 132a of every two adjacent removal tools 132a, and the other one 132a of the removal tools is located in the sliding connection groove 1322, such that any two adjacent removal tools 132a are slidably connected with each other, sliding between every two adjacent removal tools 132a can be more smooth, and then, the plurality of removal tools 132a can jointly squeeze and separate the casing from the single battery better. In the present embodiment, two removal tool assemblies 130 are arranged, and the two removal tool assemblies 130 are arranged on both sides of the pressing assembly 120 respectively. The removal tool member 132 of the removal tool assembly 130 is provided with three removal tools 132a and three second elastic members 134. The three removal tools 132a are respectively a first removal tool, a second removal tool and a third removal tool. The first removal tool is arranged adjacent to the pressing assembly 120. The third removal tool is arranged away from the pressing assembly 120. The sliding connection groove 1322 is formed in both the first removal tool and the second removal tool. The second removal tool is located in the sliding connection groove 1322 of the first removal tool and slidably connected with the first removal tool, and the third removal tool is located in the sliding connection groove 1322 of the second removal tool and slidably connected with the second removal tool, such that the second removal tool is slidably connected with the first removal tool, and the third removal tool is slidably connected with the second removal tool. During disassembly of the waste power battery pack 30, the first removal tool, the second removal tool and the third removal tool jointly squeeze and separate the connection of the edge of the casing and the single battery, such that the connection of the edge of the casing and the single battery is separated, and then, the connection of the edge of the casing and the single battery has good separation effect. In this way, the disassembly mechanism 10 can better automatically disassemble the power battery pack 30. In one embodiment, the sliding connection groove 1322 is a dovetail groove, such that reliable sliding connection is realized between the two adjacent removal tools 132a, and the sliding accuracy between the two adjacent removal tools 132a is higher.

In one of the embodiments, stiffness coefficients of the plurality of second elastic members 134 gradually decrease in a direction away from the pressing assembly 120, such that elastic forces of the plurality of second elastic members 134 under the condition of the same deformation amount gradually decrease in the direction away from the pressing assembly 120. In the present embodiment, since a length of the plurality of second elastic members 134 in a natural state gradually decreases in the direction away from the pressing assembly 120, when the plurality of second elastic members 134 are subjected to the same downward pressure, the stiffness coefficients of the plurality of second elastic members 134 gradually decrease in the direction away from the pressing assembly 120, and a deformation amount of the plurality of second elastic members 134 gradually increases in the direction away from the pressing assembly 120. Moreover, since the length of the plurality of second elastic members 134 in the natural state gradually increases in the direction away from the pressing assembly 120, the first removal tool, the second removal tool and the third removal tool abut against the connection between the edge of the casing and the single battery successively, such that when the first removal tool, the second removal tool and the third removal tool jointly squeeze and separate the connection between the edge of the casing and the single battery, the casing bents outward relative to the single battery and is gradually separated from the single battery until the edge of the casing is fully separated from the single battery, and the connection of the edge of the casing and the single battery is separated jointly by the first removal tool, the second removal tool and the third removal tool until the first removal tool, the second removal tool and the third removal tool flatten the casing on the disassembly table to complete the disassembly operation to the connection of the edge of the casing and the single battery.

In one of the embodiments, when the disassembly mechanism 10 works, the power battery pack 30 to be disassembled is delivered below the disassembly mechanism 10 through a conveyor device, and the driving mechanism drives the die base assembly 110 to move downward relative to the disassembly table. During movement of the die base assembly 110, the pressing assembly 120 first abuts against and presses the single battery of the power battery pack 30 to locate the power battery pack 30, that is, the die base assembly 110 starts to move downward until the pressing piece 122 contacts and presses an upper side surface of the single battery of the power battery pack 30, such that the battery is pressed on the disassembly table. Then the die base assembly 110 continues to move downward, such that a lower end of the first removal tool of the removal tool member 132 of the two removal tool assemblies contacts inner edges of opposite edgings of both sides of the battery and squeezes the inner edges of the both edgings to move outward and to be separated, and then the second removal tool and the third removal tool of the removal tool member 132 of the two removal tool assemblies press downward successively to continue to push the casing of the power battery pack 30 to bent downward and be separated from the single battery. Until the casing is completely separated from the single battery, that is, until the edges of the casing and the single battery are fully separated, the separation of the first pair of edges of the casing and the single battery is realized, that is, the first pair of edges of the casing is separated from the single battery by the disassembly mechanism 10. Similarly, the power battery pack 30 is rotated by 90 degrees, and the disassembly mechanism 10 uses the same method to separate the second pair of edges of the casing from the single battery.

Figure 7:
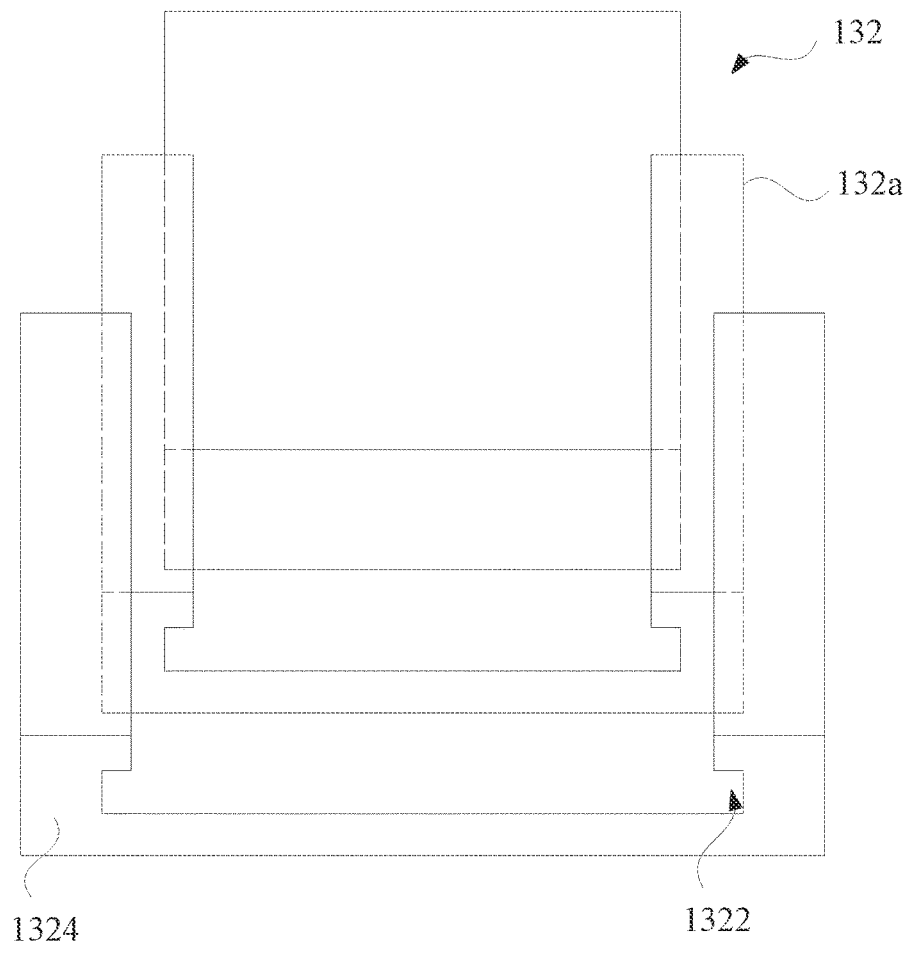
FIG. 7 is a schematic structural diagram of a removal tool assembly of the disassembly mechanism as shown in FIG. 1.

As shown in FIG. 6 and FIG. 7, further, a tool bit is arranged in an end of each removal tool 132a away from the corresponding second elastic member 134, such that each removal tool 132a can reliably act on the connection of the casing and the single battery. In the present embodiment, an inclined surface 1324 is formed in the tool bit of each removal tool 132a, that is, a first inclined surface is formed in the tool bit of the first removal tool, a second inclined surface is formed in the tool bit of the second removal tool, and a third inclined surface is formed in the tool bit of the third removal tool. In one of the embodiments, an inclination degree of the first inclined surface is 15 degrees to 45 degrees. In the present embodiment, the inclination degree of the first inclined surface is 25 degrees to 35 degrees. The inclination degree of the second inclined surface is 45 degrees to 60 degrees, and the inclination degree of the third inclined surface is 45 degrees to 70 degrees, such that the first inclined surface, the second inclined surface, and the third inclined surface have proper inclination degrees, and at the same time, the first inclined surface, the second inclined surface and the third inclined surface can better disassemble the power battery.

Since the power battery pack 30 is rectangular, dimensions of the edge of the casing connected to the single battery in a length direction and a width direction are not equal. In one embodiment, a distance between the first removal tools of the two removal tool members 132 may be adjustable or non-adjustable. In one of the embodiments, a distance between the two removal tool members 132 may be non-adjustable, and two disassembly mechanisms 10 are required for disassembly and separation of the edge of the casing connected to the single battery in the length direction and width direction, that is, a distance between two removal tool members 132 of one disassembly mechanism 10 is equal to the first pair of edges of the casing connected to the single battery in the length direction, and a distance between two removal tool members 132 of the other disassembly mechanism 10 is equal to the second pair of edges of the casing connected to the single battery in the width direction. In this way, disassembly and separation operation is performed on the two pairs of edges of the casing connected to the single battery by two disassembly mechanisms 10 of different sizes.

In order to improve the applicability of the disassembly mechanism, reduce the cost required for disassembly of the power battery pack, and improve the efficiency of the disassembly of the power battery pack, as shown in FIG. 6, in one of the embodiments, a distance between the two removal tool members 132 is adjustable, such that a distance between the two removal tool members 132 of the disassembly mechanism 10 can be adjusted according to a width of the edge of the connection of the single battery and the casing. In this way, when the power battery pack is disassembled and separated, the first pair of edges is disassembled and separated by the disassembly mechanism first, then the power battery pack is rotated by 90°, and then the second pair of edges is disassembled and separated by the disassembly mechanism, that is, the disassembly mechanism successively disassemble and separate the two pairs of different edges of the power battery pack twice, which improves the applicability of the disassembly mechanism and reduces the cost required for disassembly of the power battery pack at the same time.

As shown in FIG. 6, further, the die base assembly 110 includes a die base body 110a, a first sliding seat 110b and a second sliding seat 110c. The first sliding seat and the second sliding seat are both slidably connected to the die base body, and the first sliding seat and the second sliding seat are respectively located on both sides of the die base body, such that connection positions of the first sliding seat and the second sliding seat with the die base body are adjustable. The pressing assembly 120 is movably connected to the die base body, and the two removal tool assemblies 130 are respectively arranged on the first sliding seat and the second sliding seat, such that a distance between the two removal tool assemblies 130 is adjustable. In the present embodiment, the pressing assembly 120 is elastically and slidably connected to the die base body. One of the removal tool assemblies is elastically and slidably connected to the first sliding seat, and the other removal tool assembly is elastically and slidably connected to the second sliding seat. In one of the embodiments, a first sliding shaft 1102 and a second sliding shaft 1104 protrude from the both sides of the die base body 110a respectively. The first sliding seat is sleeved on the first sliding shaft and slidably connected with the die base body, and the second sliding seat is sleeved on the second sliding shaft and slidably connected with the die base body, such that the first sliding seat and the second sliding seat are reliably slidably connected with the die base body. Further, a first guiding shaft 1106 and a second guiding shaft 1108 also protrude from the both sides of the die base body respectively. The first guiding shaft is arranged parallel to the first sliding shaft, and the second guiding shaft is arranged parallel to the second sliding shaft. The first sliding seat is sleeved on the first guiding shaft and slidably connected with the die base body, and the second sliding seat is sleeved on the second guiding shaft and slidably connected with the die base body, such that sliding adjustment of the first sliding seat and the second sliding seat is more accurate.

In order to prevent the problem of low disassembly accuracy due to the change in the distance between the two removal tool assemblies during the disassembly of the power battery pack by the disassembly mechanism, further, the die base assembly also includes a first positioning member and a second positioning member. The first positioning member is in threaded connection with the first sliding seat, and the first positioning member is used to abut against the die base body when the first sliding seat slides to a first predetermined position relative to the die base body, and the second positioning member is used to abut against the die base body when the second sliding seat slides to a second predetermined position relative to the die base body, such that the first sliding seat, the second sliding seat and the die base body are relatively positioned, avoiding the problem of low disassembly accuracy due to the change in the distance between the two removal tool assemblies during the disassembly of the power battery pack by the disassembly mechanism. In the present embodiment, both the first positioning member and the second positioning member are locking screws or locking studs.

According to the above disassembly mechanism 10, when the two removal tool members 132 move toward the disassembly table with the die base assembly 110, first, the pressing assembly 120 abuts against and presses the single battery of the power battery pack 30 to be disassembled. Then the die base assembly 110 continues to move downward. Then the first removal tool of the two removal tool members 132 abuts against and acts on the edge of the connection of the casing and the single battery of the power battery pack 30. Then the die base assembly 110 continues to move downward. Then the second removal tool and the first removal tool of each removal tool member 132 slide relative to each other, such that the second removal tool and the first removal tool of the two removal tool members 132 jointly abut against and act on the first pair of edges of the casing and the single battery of the power battery pack 30. Then the die base assembly 110 continues to move downward. Then the second removal tool and the first removal tool, the third removal tool and the second removal tool of each first removal tool member 132 slide relative to each other, such that the third removal tool, second removal tool and first removal tool of the two removal tool members 132 jointly abut against and act on the edge of the connection of the casing and the single battery of the power battery pack 30. Then the die base assembly 110 continues to move downward until a disassembly operation that the edge of the connection of the casing and the single battery is fully separated is performed. Then the die base assembly 110 moves upward and resets. Then the power battery pack 30 is rotated by 90° with a direction perpendicular to the disassembly table as a rotation center. Then the die base assembly 110 moves toward the disassembly table. Then the pressing assembly 120 abuts against and presses the single battery of the power battery pack 30 to be disassembled, and the above steps are repeated to perform disassembly operation on the second pair of edges of the casing and the single battery. The above disassembly mechanism 10 realizes the problem of quickly separating the single battery from the metal casing of the waste power battery pack 30, the disassembly speed is fast and the disassembly effect is better, and scratches on an outer surface of a traditional manually disassembled single battery are avoided, so as to facilitate the subsequent echelon use of the single battery. The entire disassembly operation is relatively convenient, and it has the advantages of low cost, reliability and stability.

As shown in FIG. 6, further, the removal tool assembly 130 also includes a second sliding rod 136. A plurality of second sliding rods 136 are arranged. The plurality of second sliding rods 136 are respectively connected with the corresponding removal tool 132a. A plurality of second connecting grooves 115 are formed in the die base assembly 110. The plurality of second connecting grooves 115 are all communicated with the second sliding groove 113. The plurality of second sliding rods 136 are located in the plurality of second connecting grooves 115 in one-to-one correspondence, such that the plurality of second sliding rods 136 are all slidably connected to the die base assembly 110, and each removal tool 132a can slide stably relative to the die base assembly 110. In addition, any two adjacent removal tools 132a are slidably connected with each other, which improves the movement accuracy of each removal tool 132a, and then, each removal tool 132a acts more accurately between the casing and the single battery. Since the plurality of second connecting grooves 115 are all communicated with the second sliding groove 113, the structure of the die base assembly is relatively simple and easy to process, and at the same time, the difficulty of assembling the removal tool member 132 is reduced.

As shown in FIG. 6, further, the removal tool assembly 130 also includes a plurality of second guide rods 137. A plurality of second sliding guide holes 114 are also formed in the die base assembly 110. The plurality of second sliding guide holes 114 are communicated with corresponding second connecting grooves 115 respectively. The plurality of second guide rods 137 penetrate the corresponding second sliding guide holes 114 and are slidably connected with the die base assembly 110, and the plurality of second guide rods 137 are connected with the corresponding second sliding rods 136, such that each second guide rod 137 is connected with the corresponding removal tool 132a through the corresponding second sliding rod 136. Under a common guiding action of the second guide rods 137 and the second sliding rods 136, since any two adjacent removal tools 132a are slidably connected with each other, such that the movement of each removal tool 132a is more stable.

As shown in FIG. 6, further, a plurality of second elastic members 134 are arranged in the plurality of second connecting grooves 115 in one-to-one correspondence. Each second elastic member 134 is arranged around the corresponding second guide rod 137, and one end of each second elastic member 134 abuts against the second sliding rod 136, such that each second elastic member 134 can better elastically act on the corresponding second sliding rod 136. In addition, the second sliding rod 136 is located in the corresponding second connecting groove 115 and slides with the die base assembly 110, the second sliding rod 136 is connected with the corresponding removal tool 132a, and then, each removal tool 132a is better elastically and slidably connected to the die base assembly 110.

As shown in FIG. 6, further, the removal tool assembly 130 also includes a second limiting member 138 and a second limiting spring 139. A plurality of second limiting members 138 and the second limiting springs 139 are arranged. The plurality of second limiting springs 139 are sleeved on the plurality of second guide rods 137, and each second limiting spring 139 abuts against a side of the die base assembly 110 away from the removal tool 132a. The second limiting member 138 is sleeved on the second guide rod 137 and is in threaded connection with the second guide rod 137, and the second limiting member 138 abuts against the second limiting spring 139, such that an end of the second guide rod 137 away from the removal tool 132a is limited to the die base assembly 110 through the second limiting member 138, preventing the second guide rod 137 from being separated from the die base assembly 110 during sliding relative to the die base assembly 110. In the present embodiment, a diameter of the second sliding groove 113 is greater than a diameter of the second sliding guide hole 114, and a diameter of the second sliding rod 136 is greater than the diameter of the second sliding guide hole 114, such that the second sliding rod 136 is reliably limited to a side of the die base assembly 110 away from the second limiting member 138. The second limiting member 138 is a lock nut, and the second limiting member 138 is detachably connected with the second guide rod 137 to facilitate the disassembly, assembly and maintenance of the removal tool assembly 130, which improves the ease of use of the disassembly mechanism 10. In order to make the second limiting spring 139 abut against the die base assembly 110 better, further, a second abutment table 117 protrudes from the die base assembly 110, and both ends of the second limiting spring 139 abut against the second abutment table 117 and a second limiting block respectively. The limiting effect of the second limiting member 138 and the second limiting spring 139 is to limit sliding displacement of the second guide rod 137, avoiding the problem of different retraction height of the removal tool 132a due to changes in elastic force of the second elastic member 134 corresponding to the removal tool 132a which affects positions of the tool bit of the removal tool 132a, and improving the disassembly effect of the removal tool member 132 on the power battery pack 30.

As shown in FIG. 8, the present disclosure further provides a disassembly system 10 of a power battery pack, including the disassembly mechanism 10 according to any one of the above embodiments. Referring to FIG. 1 and FIG. 2 at the same time, in one of the embodiments, the disassembly mechanism 10 is used to disassemble the power battery pack 30 on the disassembly table 40. The disassembly mechanism 10 includes the die base assembly 110, the pressing assembly 120 and the removal tool assembly 130. The die base assembly 110 is installed at a power output end of a driving mechanism of the disassembly mechanism 10, such that the driving mechanism drives the die base assembly 110 to move relative to the disassembly table. The pressing assembly 120 is movably connected to the die base assembly 110, and the pressing assembly 120 is used to abut against and press the single battery of the power battery pack 30 to locate the power battery pack 30 during disassembly of the power battery pack 30. The removal tool assembly 130 is slidably connected to the die base assembly 110, and the removal tool assembly 130 is elastically connected to the die base assembly 110. The removal tool assembly 130 is used to squeeze and separate the casing of the power battery pack 30 and the single battery, such that the casing and the single battery are separated.

According to the above disassembly mechanism 10, during disassembly of the waste power battery pack 30, the power battery pack 30 is placed on the disassembly table with an opening of the casing upward. Since the pressing assembly 120 is movably connected to the die base assembly 110 and the removal tool assembly 130 is slidably connected to the die base assembly 110, when the die base assembly 110 moves toward the disassembly table, the pressing assembly 120 and the removal tool assembly 130 moves with the die base assembly 110. Therefore, the pressing assembly 120 abuts against and presses the single battery of the power battery pack 30 to locate the single battery, and at the same time, the removal tool assembly 130 squeezes and separates the casing and the single battery of the power battery pack 30, such that the casing and the single battery of the power battery pack 30 are separated. The above disassembly mechanism 10 can realize automatic disassembly of the power battery pack 30 with few manual intervention, and solves the problem of low efficiency in the recycling and disassembly process of the power battery pack 30. The above disassembly mechanism 10 realizes the automatic disassembly of the power battery pack 30, and improves the safety of the disassembly of the power battery pack 30.

In order to avoid the problem of high labor intensity of the operator, and to improve the operational safety and efficiency of the disassembly of the power battery pack 30 at the same time, as shown in FIG. 8, in one of the embodiments, the disassembly system 10 of the power battery pack further includes a controller and a waste output box 700, a sorting conveyor belt mechanism 200, a cross conveyor belt mechanism 300, a front-stage conveyor belt mechanism 400, a conductivity measuring device 500 and a turning device 600 arranged in sequence. The controller is electrically connected with control ends of the sorting conveyor belt mechanism 200, the cross conveyor belt mechanism 300, the front-stage conveyor belt mechanism 400, the conductivity measuring device 500, a horizontal rotation device and the turning device 600 respectively. In the present embodiment, the disassembly mechanism is arranged above the disassembly table. The waste output box 700 is used for preliminary adjustment and conveyance of the power battery pack 30 to the sorting conveyor belt mechanism 200. A loading port 702 and a conveying feed port (not shown) communicated to the loading port and facing the sorting conveyor belt mechanism 200 are formed in the waste output box 700. The conveying feed port is formed in a side of the waste output box 700 connected to the sorting conveyor belt mechanism 200. The loading port 702 is used to collect and place the power battery pack. The power battery pack in the waste output box 700 is output through the conveying feed port, and the conveying feed port limits the height of the power battery pack 30 output. Specifically, the power battery pack 30 has a rectangular structure, in which a length dimension is greater than a width dimension or a height dimension, and the exposed opening is one of the sides enclosed by the length and width of the power battery pack 30. The dimension of the conveying feed port in the height direction is smaller than the length of the power battery pack 30, such that the power battery pack 30 in the length direction is output through the conveying feed port at a height parallel to the feed port, which plays a role in limiting the height. In this way, the power battery pack 30 output through the conveying feed port is relatively neat. The sorting conveyor belt mechanism 200 is used to adjust an angle of the power battery pack 30, such that the angle of the power battery pack 30 is aligned for subsequent sorting processing of the power battery pack 30. The cross conveyor belt mechanism 300 is used to correct the direction of the power battery pack 30, such that the direction of the power battery pack 30 is corrected. A conductivity measuring area is formed in the front-stage conveyor belt mechanism 400, and the conductivity measuring device 500 is arranged corresponding to the conductivity measuring area. The conductivity measuring device 500 is used to detect the conductivity of each surface of the power battery pack 30 and output conductivity information.

In the above disassembly system 10 of the power battery pack, during working, first the waste power battery pack 30 in a waste battery pack box is output through the conveying feed port to limit the height output of the power battery pack 30. Then, adjustment is performed through the sorting conveyor belt mechanism 200 or the cross conveyor belt mechanism 300, and then the power battery pack 30 is corrected by the front-stage conveyor belt mechanism 400 and then conveyed to the conductivity measuring area. Six surfaces of the power battery pack 30 in the conductivity measuring area are detected through the conductivity measuring device 500, so as to obtain information of the six surfaces of the power battery pack 30, that is, to obtain information that which five of the six surfaces of the power battery pack 30 are metal surfaces, and which surface is the single battery exposed through the exposed opening, that is, the plastic surface. Then the controller stores the conductivity information measured and output by the conductivity measuring device 500, so as to perform further subsequent sorting processing on the power battery pack 30. Due to the height-limit output function of the conveying feed port, the plastic surface of the power battery pack 30 conveyed to the conductivity measuring area can only face upward, downward, left, and right. If the plastic surface of the power battery pack 30 faces upward, the power battery pack 30 is directly conveyed to the disassembly table. If the plastic surface of the power battery pack 30 faces downward, the power battery pack 30 stays at the turning device 600 and is turned 180 degrees, such that the plastic surface faces upward, and then the power battery pack is conveyed to the disassembly table. If the plastic surface of the power battery pack 30 faces the left, the power battery pack 30 stays at the turning device 600 and is turned 90 degrees clockwise, such that the plastic surface faces upward. If the plastic surface of the power battery pack 30 faces the right, the power battery pack 30 stays at the turning device 600 and is turned 90 degrees counterclockwise, such that the plastic surface faces upward. In this way, all the power battery packs 30 conveyed to the disassembly table face upward to meet the production needs of the next step of cutting and disassembling the casing. Since the battery pack is placed with the plastic surface upward, mechanization can be fully realized, manual intervention is reduced, the problem of high labor intensity of the operator is avoided, and the operational safety and efficiency of the disassembly of the power battery pack 30 are improved at the same time.

Figure 9:
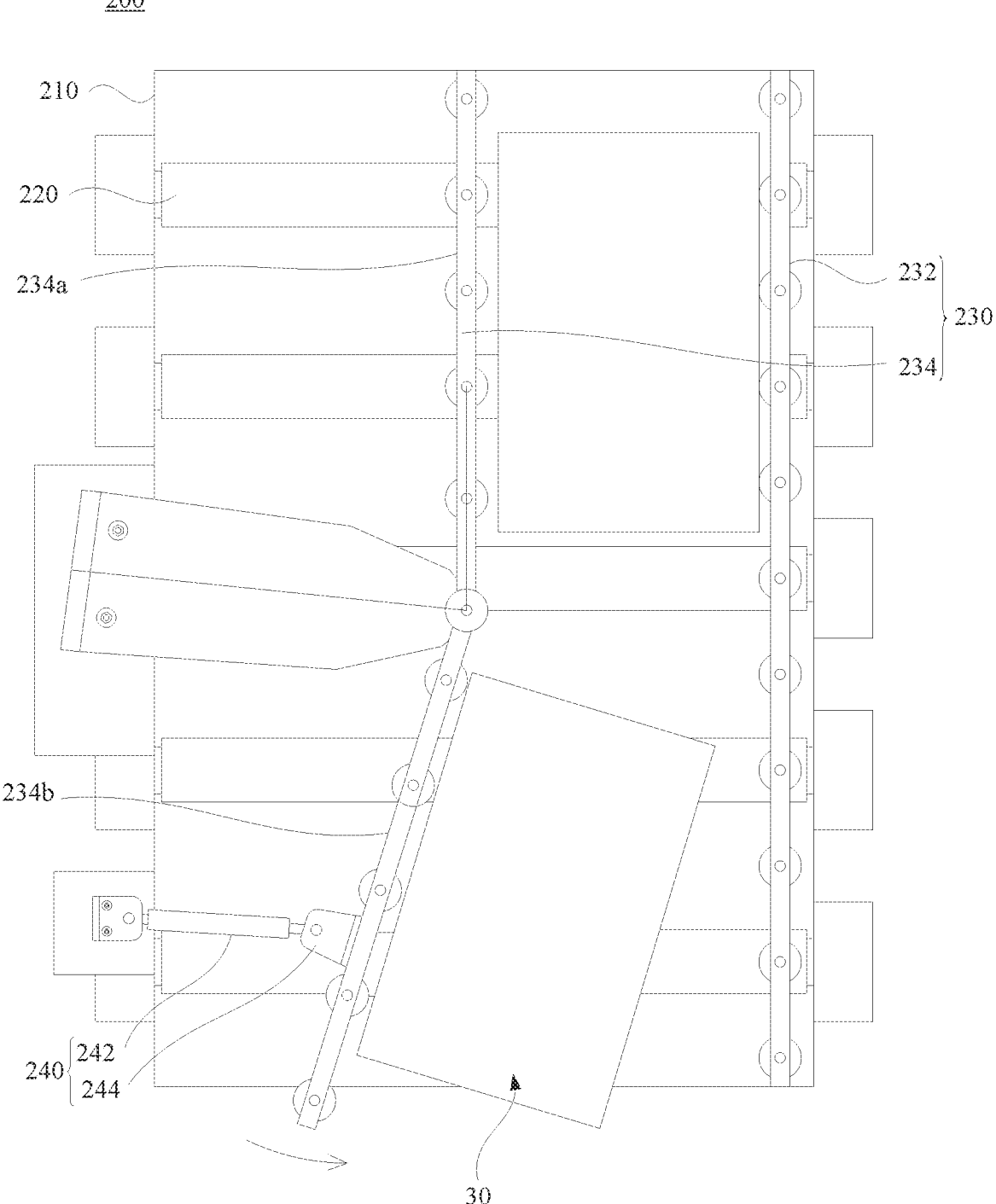
FIG. 9 is a schematic local structural diagram of a sorting conveyor belt mechanism of the disassembly system of the power battery pack as shown in FIG. 8.

As shown in FIG. 8 and FIG. 9, further, the sorting conveyor belt mechanism 200 includes a conveying table 210, a drum frame 220, a baffle 230, and a directional comparison device 240. A plurality of drum frames 220 are arranged, and the plurality of drum frames 220 are arranged parallel to each other and are all rotatably connected to the conveying table. The baffle includes a side baffle 232 and an oblique baffle 234. Both the side baffle and the oblique baffle are installed vertically on a table surface of the conveying table. A distance between the oblique baffle and the side baffle is greater than a maximum side length of the power battery pack 30. The oblique baffle includes a parallel portion 234a and an inclined portion 234b that are rotatably connected to each other. The parallel portion is parallel to the side baffle, and there is an angle between the inclined portion and the parallel portion. The directional comparison device 240 includes a cylinder 242 and a connecting block 244. The cylinder is arranged on the conveying table, and a power output end of the cylinder is rotatably connected with the connecting block. The connecting block is connected with the inclined portion. A plurality of guide drums are arranged at intervals in the side baffle and the oblique baffle to reduce a friction force suffered in a process of guiding and conveying the power battery pack 30. In the present embodiment, the conveying feed port is arranged adjacent to the inclined portion and the side baffle. When the conveying feed port outputs the power battery pack 30, the power battery pack 30 is conveyed between the inclined portion and the side baffle through the plurality of drum frames. The cylinder drives the connecting block to move, such that the connecting block drives the inclined portion to move relative to a direction close to the side baffle until the side baffle is parallel to the inclined portion. Then, the power battery pack 30 is straightened to be in a direction the same as a conveying direction of a sorting conveyor belt, such that the angle of the power battery pack 30 is aligned for subsequent sorting processing of the power battery pack 30. Furthermore, the sorting conveyor belt also includes a photoelectric sensor, which is arranged at a junction of the inclined portion and the parallel portion to quickly sense a position of the power battery pack 30. The photoelectric sensor is electrically connected with a control end of the cylinder to control the starting or closing of the cylinder.

Figure 10:
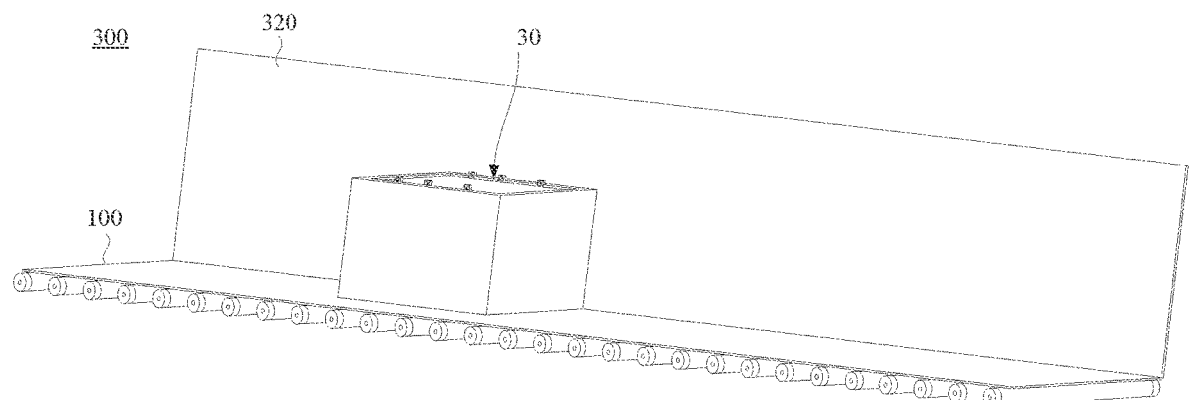
FIG. 10 is a schematic local structural diagram of a cross conveyor belt mechanism of the disassembly system of the power battery pack as shown in FIG. 8.

As shown in FIG. 8 and FIG. 10, further, a right-angle cross conveyor belt 300 includes a first conveyor belt 310 and a second conveyor belt 320. Side edges of the first conveyor belt and the second conveyor belt are close to and aligned with each other. An angle between a conveying surface of the first conveyor belt and a conveying surface of the second conveyor belt is adjustable. An included angle between the conveying surface of the first conveyor belt and the conveying surface of the second conveyor belt is 80 degrees to 100 degrees. A front section of the first conveyor belt is horizontally engaged with the sorting conveyor belt. A middle section of the first conveyor belt is gradually inclined toward a side in which the first conveyor belt and the second conveyor belt are aligned. A rear section of the first conveyor belt is restored to be horizontal. A first guide plate for guiding is arranged on a side of the front section of the first conveyor belt away from the second conveyor belt to guide the conveyance of the power battery pack 30, and then, the right-angle cross conveyor belt can better convey and adjust the power battery pack 30. In the present embodiment, the cross conveyor belt mechanism 300 is used to correct the direction of the power battery pack 30, such that the direction of the power battery pack 30 is corrected.

Further, the front-stage conveyor belt mechanism 400 includes a front-stage conveying drum, a front-stage conveying drum frame, and a front-stage conveying guide plate. The front-stage conveying drum is rotatably connected to the front-stage conveying drum frame. An input end of a front-stage conveyor belt is connected with a tail end of the cross conveyor belt, that is, the input end of the front-stage conveyor belt is connected with the rear section of the first conveyor belt. The front-stage conveying guide plate is arranged on both sides of the front-stage conveying drum frame. The conductivity measuring area is formed in the front-stage conveying drum frame. The conductivity measuring device 500 is arranged in the conductivity measuring area. A static drum is arranged in the conductivity measuring area, and the static drum and the front-stage conveying drum frame are relatively static. Measuring holes are formed in lower, upper, left, right, front and rear portions of the conductivity measuring area. The conductivity measuring device 500 is arranged at the measuring hole. A conductive pin of the conductivity measuring device 500 is arranged in a middle portion of the measuring hole, such that the power battery pack 30 is reliably conveyed under the guidance of the front-stage conveying guide plate during conveyance of the front-stage conveying drum, and then, the power battery pack 30 is reliably conveyed to the conductivity measuring area for conductivity detection.

Figure 11:
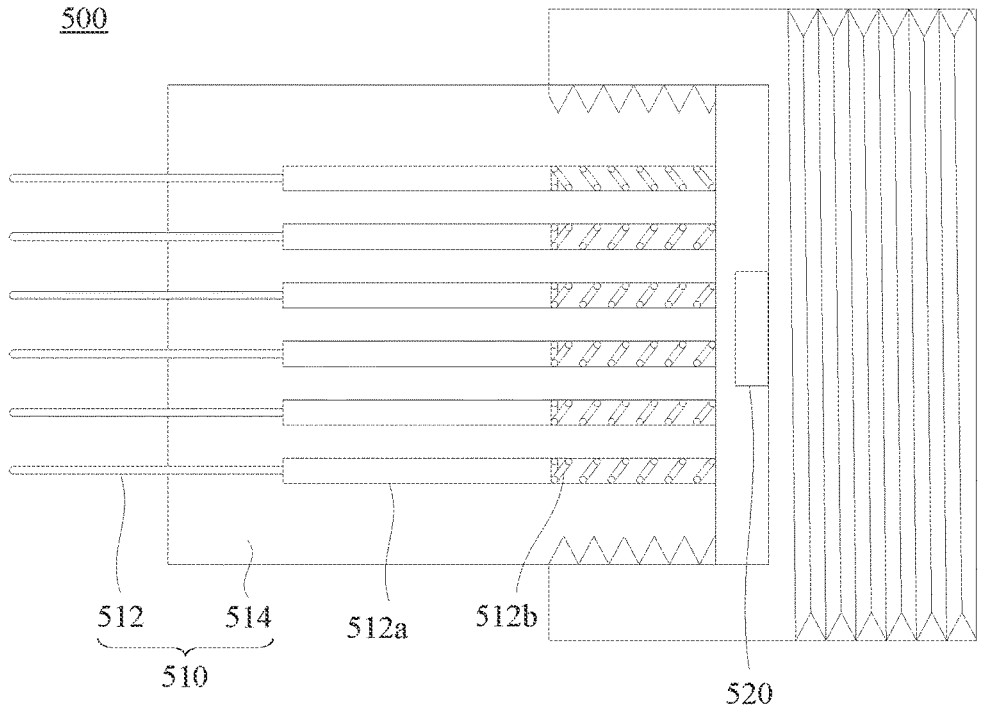
FIG. 11 is a schematic local structural diagram of a conductivity measuring device of the cross conveyor belt mechanism of the disassembly system of the power battery pack as shown in FIG. 8.

As shown in FIG. 11, further, the conductivity measuring device 500 includes a measuring head 510 and a current sensor 520. The measuring head includes an elastically retractable probe 512 and a body part 514. A probe groove 514a is formed in the body part. The probe is arranged in the probe groove and slidably connected with the body part. Further, the probe includes a probe body 512a and a spring 512b, and the spring is arranged between a bottom of the probe groove and the probe body. In the present embodiment, a plurality of the probes and probe grooves are arranged. The plurality of probes are respectively located in the corresponding probe grooves and slidably connected with the body part. A plurality of the springs are arranged in one-to-one correspondence with the plurality of probes. The plurality of probes are divided into two sets insulated from each other. One set of probes is connected with a positive electrode of the current sensor, and the other set of probes is connected with a negative electrode of the current sensor. A signal output terminal of the current sensor is connected with the controller, such that the conductivity measuring device 500 detects the conductivity of each surface of the power battery pack 30 and outputs the conductivity information.

As shown in FIG. 12 to FIG. 14, further, the turning device 600 includes a supporting unit 610, a buckle device 620, a conveying rack unit 630 and a rotary driving device 640. In one of the embodiments, the supporting unit 610 includes a base 612, a first supporting plate 614, a second supporting plate 616 and two circular track plates 618. The two circular track plates are arranged opposite to each other and both fixedly connected with the base. The first supporting plate and the second supporting plate are respectively rotatably arranged in inner circular surfaces of the two track plates. A square opening 618*a* is formed in each track plate, and a conveying rack chute 618*b* is formed in both the first supporting plate and the second supporting plate 616.

As shown in FIG. 12 to FIG. 14, in one of the embodiments, the conveying rack unit 630 includes an upper frame 632, a lower frame 634, a roller assembly 636, and a telescopic driving device 638. The roller assembly includes an upper roller and a lower roller. The upper roller is rotatably connected to the upper frame. The lower roller is rotatably connected to the lower frame. The telescopic driving device is hinged to the upper frame and the lower frame respectively. Both ends of the upper frame are slidably connected with the conveying rack chutes of the two track plates respectively. Both ends of the lower frame are slidably connected with the conveying rack chutes of the two track plates respectively.

As shown in FIG. 12 to FIG. 14, further, the buckle device 620 includes a sliding block 622, a lock spring 624, a bottom spring 626, a rolling support wheel 628 and a lock tongue 629. A receiving groove 618*c* communicated with the conveying rack chute is formed in each track plate. A lock tongue groove 622*a* communicated with the receiving groove is formed in the sliding block. The lock tongue groove is matched with the lock spring. The lock tongue is located in the lock tongue groove and fixedly connected with the sliding block. In the present embodiment, a flange protrudes from an outer end of the lock tongue, such that the lock tongue is reliably fixedly connected to the lock tongue groove. The rolling support wheel is arranged on the sliding block, and the rolling support wheel is matched with an inner circular surface track of the track plate, such that the rolling support wheel is in rolling connection with an inner wall of the track plate.

As shown in FIG. 12 to FIG. 14, further, a lock tongue hole is formed in an inner end of the receiving groove 618*c* in a direction of the conveying rack chute 618*b*. The buckle device is located in the receiving groove, and is in fit connection with the first supporting plate or the second supporting plate through the bottom spring. Further, a positioning hole 631 is formed in both the upper frame and the lower frame at positions corresponding to the lock tongue hole. The positioning hole is used to cooperate with the lock tongue of the buckle device. A groove 618*d* is formed in an upper and lower end of the inner circular surface of the track plate at positions corresponding to a bottom end of the conveying rack chute. When the upper frame or the lower frame is located at the position corresponding to the conveying rack chute, the rolling support wheel slides into the groove, and the buckle device automatically exits outward under the action of the bottom spring and unlocking of the lock tongue and the positioning hole of the upper frame or the lower frame. In the present embodiment, four receiving grooves and buckle devices are arranged, and the four buckle devices are arranged in the corresponding receiving grooves in one-to-one correspondence.

As shown in FIG. 12 to FIG. 14, further, the rotary driving device 640 includes a rotary driving mechanism 642 and a transmission mechanism 644. A power output end of the rotary driving mechanism is connected with the transmission mechanism. The transmission mechanism is connected with the first supporting plate and the second supporting plate respectively to drive the first supporting plate and the second supporting plate to rotate synchronously. A position switch is arranged in the rotary driving mechanism 642, and the position switch is used to generate a signal that the power output end of the rotary driving mechanism stops action when the rolling support wheel is located in the conveying rack chute of the track plate. In the present embodiment, the position switch is electrically connected with a control end of the rotary driving mechanism and the controller respectively. In the present embodiment, the rotary driving mechanism may be a rotary driving motor or an electric cylinder, and the rotary driving mechanism is arranged on the base.

As shown in FIG. 12 to FIG. 14, further, two transmission mechanisms are arranged. The two transmission mechanisms are connected with the power output end of the rotary driving mechanism. The two transmission mechanisms are connected with the first supporting plate and the second supporting plate respectively to drive the first supporting plate and the second supporting plate to rotate synchronously. Furthermore, each transmission mechanism 644 includes a transmission shaft 644*a*, a small gear 644*b*, and a large gear 644*c*. The small gear is arranged on the transmission shaft, and the small gear and the large gear are in mesh transmission. The large gears of the two transmission mechanisms are fixedly connected with the first supporting plate and the second supporting plate respectively. Output shafts of the rotary driving mechanism are connected with the transmission shafts of the two transmission mechanisms respectively, such that power of the rotary driving mechanism is transmitted to the corresponding supporting plate through the corresponding transmission shaft, the small gear and the large gear respectively, and then, the first supporting plate and the second supporting plate are rotatably connected with respect to the corresponding track plate respectively.

During working, the rotary driving device drives the first supporting plate and the second supporting plate to rotate at the same time. When the rolling support wheel of the buckle device is located in the groove of the track plate, the position switch sends a termination signal, and a supporting plate driving device stops working. At this time, two pairs of the telescopic driving devices work and expand to separate the upper frame and the lower frame to both ends of the conveying rack chute. At this time, the two lock tongues at the lower end are separated from the positioning hole located in the lower frame, the two lock tongues at the upper end are locked in the positioning hole located in the upper frame, and the battery is conveyed to the center of the conveying rack through a previous level of external conveyor belt. If the power battery pack 30 does not need to be turned, the roller assembly rotates to convey the battery to a next level of external conveyor belt, so as to start the next step. If the power battery pack 30 needs to be turned, the two pairs of telescopic driving devices start to shrink, the battery is lifted and clamped between the upper frame and the lower frame, and the rotary driving mechanism starts to work, and drives the two small gears to rotate synchronously through the transmission shaft to drive the two large gears to rotate.

The large gears drive the conveying rack unit to clamp the power battery pack 30 to rotate 90 degrees or 180 degrees together. At this time, the telescopic driving device starts to expand, the lock tongue located in the buckle device corresponding to the lower frame is separated outward to unlock with the lower frame, and the lock tongue of the buckle device on the upper side and the upper frame cooperate with each other for locking at the same time. At this time, the next battery pack is conveyed from the previous level of conveyor belt to the center of the conveying rack. If the battery still needs to be turned, the telescopic driving device continues to shrink, because the upper frame is locked and the lower frame is unlocked. Therefore, the lower frame still faces upward, the battery pack is lifted and pressed between the upper frame and the lower frame, the rotary driving mechanism starts to work, and performs rotation by 90 degrees or 180 degrees in the opposite direction, and the roller rotates to output the turned battery pack to the next level of conveyor belt.

The present disclosure further provides a disassembly method of a power battery pack, using the disassembly system of the power battery pack according to any one of the above embodiments for disassembly of a power battery. In one of the embodiments, the disassembly method of the power battery pack includes:

S103, The power battery pack is placed on the disassembly table with the plastic surface upward.

In the present embodiment, the power battery pack is placed on the disassembly table with the plastic surface upward, that is, the power battery pack is placed on the disassembly table with a surface of the single battery exposed to the exposed opening upward.

S105, The die base assembly is driven to perform a first displacement from an initial position in a direction close to the disassembly table to a first position, such that the pressing assembly abuts against and presses the single battery of the power battery pack.

S107, The die base assembly is driven to perform a second displacement from the first position in the direction close to the disassembly table to a second position, such that the pressing assembly moves relative to the die base assembly, and the removal tool assembly starts to squeeze the first pair of edges of the casing connected to the single battery of the power battery pack.

S109, The die base assembly is driven to perform a third displacement from the second position in the direction close to the disassembly table to a third position, such that the pressing assembly and the removal tool assembly both move relative to the die base assembly, the removal tool assembly squeezes and separates the first pair of edges of the casing connected to the single battery of the power battery pack, and then, the first pair of edges of the metal casing connected to the single battery is fully separated.

S111, The die base assembly is driven to move in a direction away from the disassembly table to the initial position.

S113, The power battery pack is rotated by 90 degrees with a vertical direction as a center relative to the disassembly table.

Step S105 to step S109 are repeated to fully separate the second pair of edges of the metal casing connected to the single battery.

According to the above disassembly method of the power battery pack, during disassembly of the waste power battery pack, the power battery pack is placed on the disassembly table with an opening of the casing upward. Since the pressing assembly is movably connected to the die base assembly and the removal tool assembly is slidably connected to the die base assembly, when the die base assembly moves toward the disassembly table, the pressing assembly and the removal tool assembly moves with the die base assembly. Therefore, the pressing assembly abuts against and presses the single battery of the power battery pack to locate the single battery, and at the same time, the removal tool assembly squeezes and separates the casing and the single battery of the power battery pack. The above disassembly mechanism can realize automatic disassembly of the power battery pack with few manual intervention, and solves the problem of low efficiency in the recycling and disassembly process of the power battery pack. The above disassembly mechanism realizes the automatic disassembly of the power battery pack, and improves the safety of the disassembly of the power battery pack.

In one of the embodiments, before step S103, the disassembly method of the power battery pack further includes:

S101, An edge of the plastic surface of the power battery pack corresponding to a top of the single battery is cut off. That is, the side piece structure 32*b* of the casing of the power battery pack at the periphery of the exposed opening is cut off, such that a cutting opening is formed in the top of the power battery pack, the single battery, that is, the plastic surface of the power battery pack is better exposed to the outside, and then, the removal tool assembly can better squeeze the edge of the metal casing connected to the single battery. FIG. 15 is a schematic structural diagram of a power battery pack in a case that a side piece structure of a casing of the power battery pack at the periphery of an exposed opening is cut off.

In one of the embodiments, before step S101, the disassembly method of the power battery pack further includes:

S90, The placement of the power battery pack is automatically adjusted, such that the power battery pack is placed on the disassembly table with the plastic surface upward. Mechanization can be fully realized, manual intervention is reduced, the problem of high labor intensity of the operator is avoided, and the operational safety and efficiency of the disassembly of the power battery pack are improved at the same time.

Further, steps of automatically adjusting the placement of the power battery pack includes: first the power battery pack is output through the conveying feed port of the waste battery pack box to limit the height output of the power battery pack. Then, the angle of the power battery pack is adjusted through the sorting conveyor belt mechanism; and/or, the direction of the power battery pack is corrected through the cross conveyor belt mechanism; and/or, then the power battery pack is corrected by the front-stage conveyor belt mechanism and then conveyed to the conductivity measuring area. Then, the six surfaces of the power battery pack in the conductivity measuring area are detected through the conductivity measuring device, so as to obtain information of the six surfaces of the power battery pack, that is, to obtain information to determine which five of the six surfaces of the power battery pack are metal surfaces, and which surface is the plastic surface. Then the controller stores the conductivity information measured and output the information by the conductivity measuring device, so as to perform further subsequent sorting processing on the power battery pack. Due to the height-limit output function of the conveying feed port, the plastic surface of the power battery pack conveyed to the conductivity measuring area can only face upward, downward, left, and right. Then, the controller controls whether the turning device performs turning operation on the power battery pack. Finally, the power battery pack subjected to the turning operation is conveyed to the disassembly table.

In the present embodiment, the controller controls whether the turning device performs the turning operation on the power battery pack, and specifically, if the plastic surface of the power battery pack faces upward, the power battery pack is directly conveyed to the disassembly table. If the plastic surface of the power battery pack faces downward, the power battery pack stays at the turning device and is turned 180 degrees, such that the plastic surface faces upward, and then the power battery pack is conveyed to the disassembly table. If the plastic surface of the power battery pack faces the left, the power battery pack stays at the turning device and is turned 90 degrees clockwise, such that the plastic surface faces upward. If the plastic surface of the power battery pack faces the right, the power battery pack stays at the turning device and is turned 90 degrees counterclockwise, such that the plastic surface faces upward. In this way, all the power battery packs conveyed to the disassembly table face upward to meet the production needs of the next step of cutting and disassembling the casing. Since the battery pack is placed with the plastic surface upward, mechanization can be fully realized, manual intervention is reduced, the problem of high labor intensity of the operator is avoided, and the operational safety and efficiency of the disassembly of the power battery pack are improved at the same time.

Compared with the prior art, the present disclosure at least has the following advantages:

According to the disassembly mechanism of the present disclosure, during disassembly of the waste power battery pack, the power battery pack is placed on a disassembly table with an opening of the casing upward. Since the pressing assembly is movably connected to the die base assembly and the removal tool assembly is slidably connected to the die base assembly, when the die base assembly moves toward the disassembly table, the pressing assembly and the removal tool assembly moves with the die base assembly. Therefore, the pressing assembly abuts against and presses the single battery of the power battery pack to locate the single battery, and at the same time, the removal tool assembly squeezes and separates the casing and the single battery of the power battery pack. The above disassembly mechanism can realize automatic disassembly of the power battery pack with few manual intervention, and solves the problem of low efficiency in the recycling and disassembly process of the power battery pack. The above disassembly mechanism realizes the automatic disassembly of the power battery pack, and improves the safety of the disassembly of the power battery pack.

The above-mentioned embodiments only express several implementations of the present disclosure, and the descriptions thereof are relatively specific and detailed, but they should not be thereby interpreted as limiting the scope of the present disclosure. It should be pointed out that several modifications and improvements can also be made by those of ordinary skill in the art without departing from the concept of the present disclosure, and all of these fall within the protection scope of the present disclosure. Therefore, the protection scope of the present disclosure should be subject to the appended claims.

The invention claimed is:

1. A disassembly mechanism, comprising:
a die base assembly;
a pressing assembly, movably connected to the die base assembly, and used to abut against and press a single battery of a power battery pack; and
a removal tool assembly, slidably connected to the die base assembly, and elastically connected to the die base assembly, and used to squeeze and separate a casing of the power battery pack from the single battery;
wherein the removal tool assembly comprises a removal tool member and a second elastic member, the removal tool member is slidably connected to the die base assembly, and the second elastic member is connected with the removal tool member and the die base assembly respectively; the removal tool member comprises a plurality of removal tools, any two adjacent removal tools are slidably connected with each other, a plurality of second elastic members are arranged, and the plurality of second elastic members are connected with one corresponding removal tool respectively.

2. The disassembly mechanism according to claim 1, wherein two removal tool assemblies are arranged, and the two removal tool assemblies are arranged on both sides of the pressing assembly respectively.

3. The disassembly mechanism according to claim 1, wherein the pressing assembly is further elastically connected to the die base assembly.

4. The disassembly mechanism according to claim 3, wherein the pressing assembly comprises a pressing piece and a first elastic member, a first sliding groove is formed in the die base assembly, the first elastic member is arranged in the first sliding groove, a part of the pressing piece is located in the first sliding groove and slidably connected with the die base assembly, and the pressing piece abuts against the first elastic member.

5. The disassembly mechanism according to claim 1, wherein a second sliding groove is formed in the die base assembly, the removal tool member is located in the second sliding groove and slidably connected with the die base assembly, the second elastic member is arranged in the second sliding groove, and the second elastic member is connected with the removal tool member.

6. The disassembly mechanism according to claim 5, wherein the pressing assembly comprises a pressing piece, a first elastic member and a first guide rod, a first sliding groove is formed in the die base assembly, the first elastic member is arranged in the first sliding groove, a part of the pressing piece is located in the first sliding groove and slidably connected with the die base assembly, and the pressing piece abuts against the first elastic member;
a first sliding guide hole communicated with the first sliding groove is formed in the die base assembly, the first guide rod penetrates the first sliding guide hole and is slidably connected with the die base assembly, one end of the first guide rod is connected with the pressing piece.

7. The disassembly mechanism according to claim 5, wherein a sliding connection groove is formed in one of every two adjacent removal tools, and the other one of the removal tools is located in the sliding connection groove, such that any two adjacent removal tools are slidably connected with each other.

8. The disassembly mechanism according to claim 7, wherein stiffness coefficients of the plurality of second elastic members gradually decrease in a direction away from the pressing assembly.

9. A disassembly system for a power battery pack, comprising the disassembly mechanism according to claim 1.

10. A disassembly method of a power battery pack, using the disassembly system for a power battery pack according to claim 9 for disassembly of a power battery.

\* \* \* \* \*